Aug. 18, 1959 W. J. HAFNER ET AL 2,900,146
PNEUMATIC CONVEYOR SYSTEM
Filed Sept. 11, 1952 3 Sheets-Sheet 1
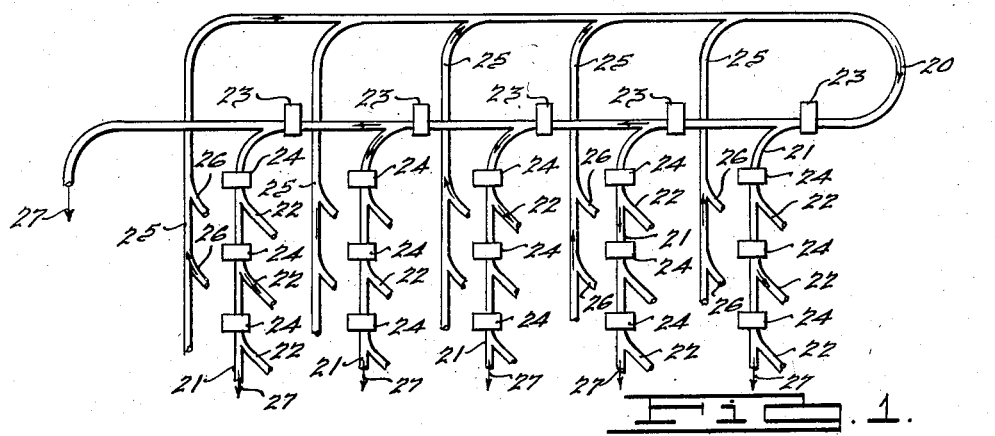
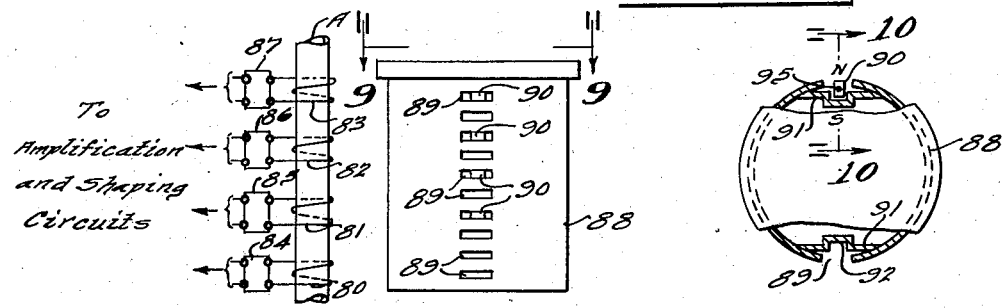
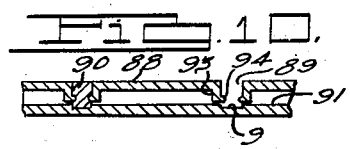
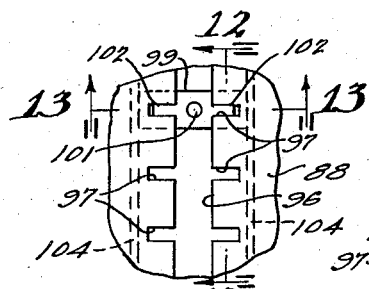 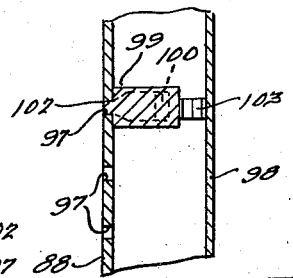
INVENTORS.
William J. Hafner,
Gordon H. Cork.
BY
Jay C Taylor
ATTORNEY.

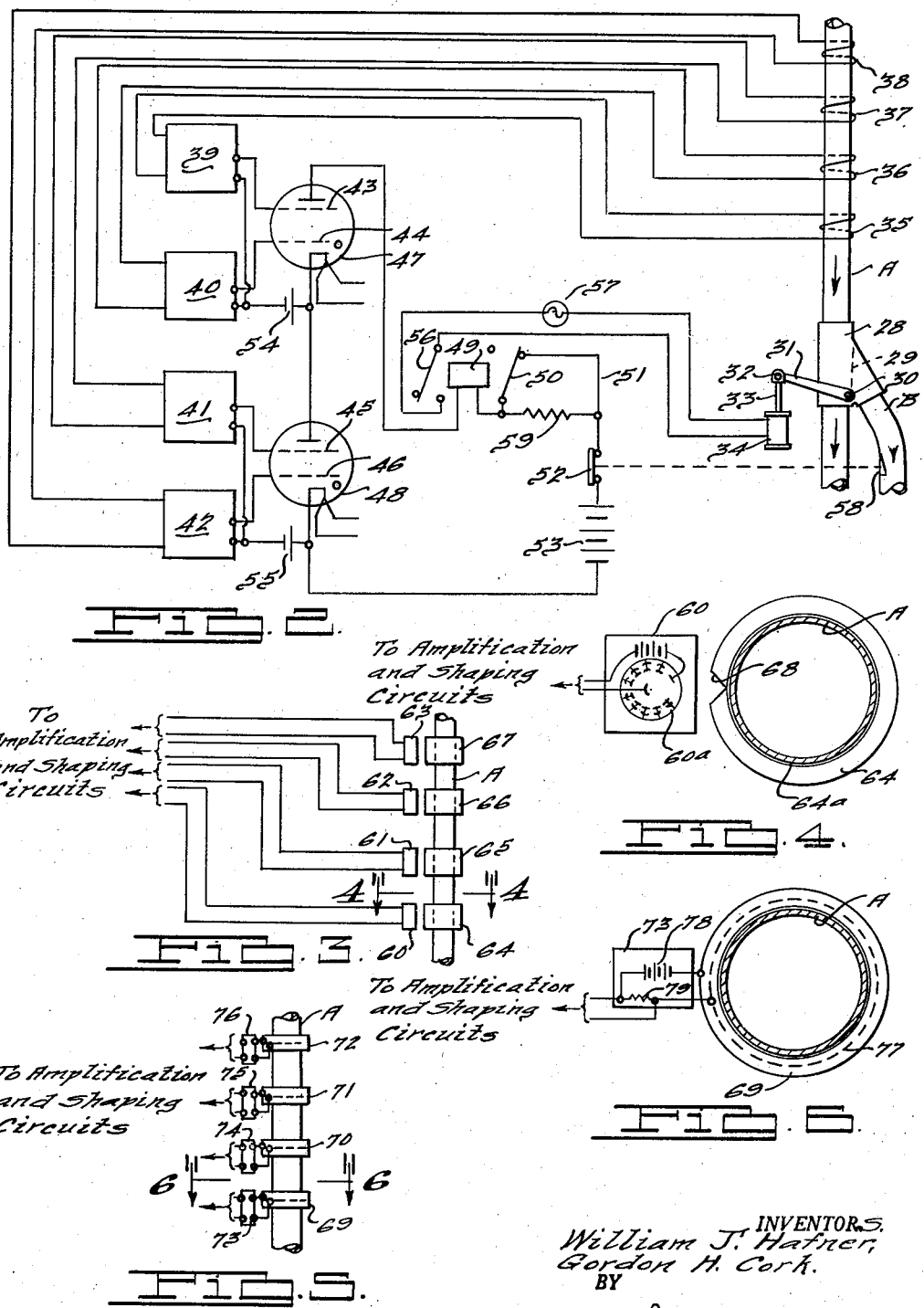

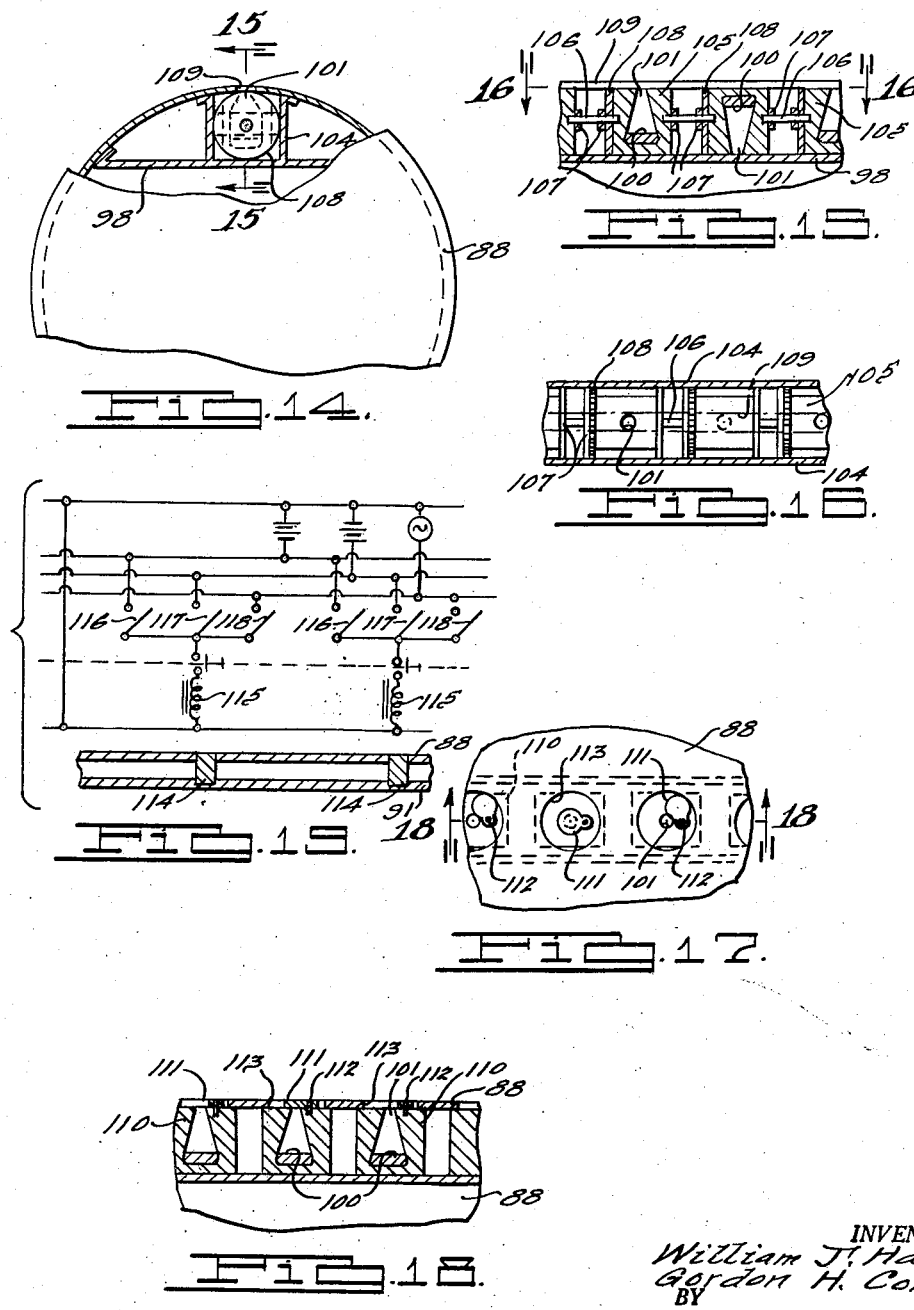

United States Patent Office 2,900,146
Patented Aug. 18, 1959

2,900,146

PNEUMATIC CONVEYOR SYSTEM

William J. Hafner, Berkley, and Gordon H. Cork, Birmingham, Mich.; said Hafner assignor to said Cork Application September 11, 1952, Serial No. 309,114

10 Claims. (Cl. 243—36)

This invention relates to a message conveyor system and in particular to a pneumatic conduit system, wherein a suitably addressed cylindrical message carrier is dispatched from any one of a number of stations or message centers and automatically conveyed through tubular conduits to a predetermined one of the other stations or centers.

The subject matter relating specifically to a radioactive signal element and pick up system shown in Figs. 2–6 and Figs. 11–18 inclusive of the drawings is included in a copending divisional application, filed June 3, 1959, Ser. No. 817,748.

Subject matter relating to a message conveyor system including a carrier adapted to travel along a conduit means, a guideway extending axially of the carrier, and a plurality of magnetic slugs polarized radially of the carrier and shiftable axially with respect to each other along the guideway is covered in applicants' co-pending application Serial No. 444,274, filed July 19, 1954.

It is common in such systems to provide an electromagnetically actuated selector mechanism at each station or center adapted to operate in response to a predetermined signal from the message carrier to divert the latter to the proper station or center to which the carrier is addressed. By suitably adjusting the signal, the carrier can be addressed to any desired station. A commonly employed type of signal comprises one or more signal rings of ferro-magnetic material for example adjustably axially along the carrier so as to actuate a prearranged magnetically responsive selector mechanism associated with the station to which the carrier is addressed without actuating similar selector mechanism responsive to different spacings of the signal rings. A serious difficulty encountered in the use of such signal rings is their great inertia and the abuse to which the carriers are subjected as a result of high speed travel and sudden starts and stops, whereby the rings eventually break loose from their securing means and batter the carriers out of shape, as well as move out of the desired axial adjustment required for actuation of the proper selector mechanism.

An important object of the present invention is to provide an improved highly efficient pneumatic dispatch and selector system which is comparatively simple and economical in construction and operation, comprising a plurality of fixed signal detectors arranged axially along the tubular conduit of the system at each station or message center in accordance with a predetermined axial spacing pattern, in combination with a number of small lightweight signal elements on the carrier and adapted to be adjustably arranged thereon in accordance with the spacing pattern of the signal detectors at any desired station, whereby when the signal elements of the carrier match the signal detectors at the desired station during the course of travel of the carrier, an electronic selector circuit is actuated to activate an electromagnetically operated diverter mechanism which directs the carrier to that station.

Another object is to provide an improved pneumatic dispatch and selector system of the foregoing character wherein each signal detector comprises a fine detector coil, such as an induction coil or a coil of wire sensitive to a magnetic field, coupled with the electronic circuit. Each signal element comprises a small permanent magnet polarized radially of the carrier to induce an impulse in each detector coil upon passing the same.

A number of significant advantages over conventional practices are achieved by the foregoing construction. At the outset, small lightweight signal elements are made feasible which are readily adjusted axially of the carrier and secured in place, since inertial forces acting on the lightweight signal elements are negligible. The radially polarized magnets are feasibly removed entirely or reversed as to polarity. In application with the induction coil signal detector, three distinct types of signals are thus readily effected at each position of axial adjustment of the magnets and the total number of possible signal combinations for a given number of positions of axial adjustment is materially increased. Also by employing the detector coils completely around the corresponding tubular conduit, reception of signals from the magnetic signal element is possible regardless of the rotational position of the carrier within the tubular conduit.

Another object is to provide an improved system of the above character wherein the signal elements comprise bodies of radioactive material carried by the carrier and adjustably spaced axially thereon. In this arrangement, signal detectors responsive to the radioactive emission from said bodies are provided at predetermined locations spaced along the conduit.

In the above application, the signals received from the radio active signal elements are to all practical purposes independent of the speed of the carrier. Thus use of radio active signal elements achieves a greater signal selectivity and permits much closer axial spacing of the signal elements than has been feasible heretofore. In consequence, a more efficient and positive selector operation is achieved and a greater number of useful signal combinations is made possible.

Another object of the invention is to provide an improved and highly efficient electronic selector circuit cooperative with the signal detector means to amplify the signals detected thereby so as to activate the selector mechanism, and in particular to provide such a circuit wherein the amplified pulse from each detector means is applied in proper phase to the grids of a number of gaseous discharge tubes arranged in series so that all must fire or conduct simultaneously to complete an electrical circuit through the series, the latter circuit when completed being employed to activate the electromagnetically actuated selector mechanism.

Another and more specific object is to provide an electronic selector circuit of the foregoing character wherein the gaseous discharge tubes comprise thyratron having screen and control grids, each grid being coupled with one of each of the detector coils to receive an amplified signal pulse of positive potential therefrom and being negatively biased so as to prevent firing of its respective tube until made less negative by the amplified signal pulse.

Thus when a carrier approaches a station whereat the spacing of the signal elements matches the spacing of the detector means, the potentials of all the thyratron grids will be raised simultaneously to the potentials at which firing of the corresponding thyratrons is possible, whereupon all the thyratrons will fire and cause actuation of the selector mechanism to divert the carrier to that station. Since both the screen and control grids of each thyratron must simultaneously be at the firing potential before the tube will fire and since all of the thyratrons in series must be ready to fire simultaneously in order to complete a circuit therethrough, the failure of a signal at one or more of the detector means will prevent firing of all of the thyratrons. In consequence of this circuit arrangement, both grids of each thyratron effectively serve to control its firing, so that the number of control tubes or thyratrons required equals only one half the number of detector means employed.

Still another object is to provide an improved pneumatic dispatch and selector system comprising a main trunk conduit branching into several primary branch conduits each of which in turn branches into one or more secondary branch conduits leading to the message centers or stations. A primary selector mechanism responsive to one type of signal from the message carrier is arranged along the trunk conduit in advance of each primary branch conduit and a secondary selector mechanism responsive to another type of signal from the carrier is arranged in advance of each secondary branch conduit. The signal elements on the message carrier are arranged in two sets differing in type or character from each other, one set being adjustable so as to actuate a predetermined primary selector mechanism and cause diversion of the carrier into a desired primary branch conduit and the other set being adjustable so as to actuate a predetermined secondary selector mechanism and cause diversion of the carrier into a desired secondary branch conduit.

By this arrangement, a hundred stations for example can be divided into ten groups located respectively along ten primary branch conduits. Each set of signal elements on the carrier need have provision for adjustment to only ten different combinations, rather than to a hundred different combinations as would otherwise be required if the entire hundred stations were arranged along a single conduit. Fewer signal elements and positions of adjustment thereof are thus required for each set, resulting in greater spacing between adjacent signal elements in their adjusted positions and consequent greater differentiation between the signal combinations and more positive and efficient signal selection by the electronic selector circuits. Also by virtue of the foregoing arrangement, the two sets of signal elements are feasibly arranged along diametrically opposed sides of the cylindrical message carrier, achieving automatic balancing of the latter. In accordance with preferred constructions of the present invention, one set of signal elements comprises radially polarized magnets and the other set comprises radially outward opening vials of radio active material, or in the alternative, the two sets comprise radially polarized magnets, the magnets of one set having their north poles outward and the magnets of the other set having their south poles outward.

Other objects are to provide an improved signal means for a message carrier comprising a plurality of small slugs of magnetizable material fixed on the carrier at axially spaced locations, each slug being adapted to be selectively polarized radially or depolarized by placement in juxtaposition with one pole of a polarizing solenoid; and to provide in combination with such a carrier a polarizing machine having a plurality of polarizing solenoids spaced so as to match the axial spacing of said slugs, whereby the latter are adapted to be placed adjacent the solenoids and selectively polarized, reversed in polarity, or depolarized by selectively energizing the solenoids by direct or alternating current as required.

Other objects of this invention will appear in the following description and appended claims, reference being had to the accompanying drawings forming a part of this specification wherein like reference characters designate corresponding parts in the several views.

Fig. 1 is a fragmentary schematic view of a pneumatic tube dispatch and selector system embodying the present invention.

Fig. 2 is an enlarged diagrammatic view of one of the selector circuits embodying the present invention and adapted for use with the system illustrated in Fig. 1.

Fig. 3 is a fragmentary diagrammatic view similar to Fig. 2, showing a modified selector circuit adapted to supplant the circuit shown in Fig. 2.

Fig. 4 is an enlarged view taken in the direction of the arrows along the line 4—4 of Fig. 3.

Fig. 5 is a fragmentary diagrammatic view similar to Fig. 2 but showing another selector circuit adapted to supplant the circuit shown in Fig. 2.

Fig. 6 is an enlarged view taken in the direction of the arrows along the line 6—6 of Fig. 5.

Fig. 7 is a view similar to Fig. 2, but showing still another selector circuit adapted to supplant the circuit shown in Fig. 2.

Fig. 8 is a side view of a message carrier embodying the present invention and adapted for use with the system illustrated in Fig. 1.

Fig. 9 is an enlarged end view taken in the direction of the arrows along the line 9—9 of Fig. 8, portions being broken away to show the adjustable signal mechanism.

Fig. 10 is a fragmentary enlarged section taken in the direction of the arrows along the line 10—10 of Fig. 9.

Fig. 11 is a fragmentary enlarged side view of a carrier similar to that shown in Fig. 8, illustrating a modification of the signal mechanism.

Fig. 12 is a fragmentary sectional view taken in the direction of the arrows along the line 12—12 of Fig. 11.

Fig. 13 is a fragmentary enlarged sectional view taken in the direction of the arrows along the line 13—13 of Fig. 11.

Fig 14 is an end view of a carrier similar to that shown in Fig. 9, portions being broken away to illustrate a modification of the signal mechanism.

Fig. 15 is a fragmentary sectional view taken in the direction of the arrows along the line 15—15 of Fig. 14.

Fig. 16 is a fragmentary sectional view taken in the direction of the arrows along the line 16—16 of Fig. 15.

Fig. 17 is a fragmentary side view of a carrier similar to that shown in Fig. 8, but illustrating still another modification of the signal mechanism.

Fig. 18 is a fragmentary sectional view taken in the direction of the arrows along the line 18—18 of Fig. 17.

Fig. 19 is a fragmentary sectional view similar to Fig. 10, but showing another modification of the signal means and also showing a diagrammatic view of a magnet polarizing machine embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a pneumatic dispatch system is illustrated by way of example comprising a main or trunk tubular conduit 20 having a number of primary branching tubular conduits 21, each of the latter in turn having a number of secondary branching tubular conduits 22. It is assumed herein that each conduit branch 22 discharges to a message receiving station or center, although it will be apparent from the following that each branch 22 may be provided with additional sub-branches where required in a large or complex dispatch system.

Immediately preceding each primary or secondary branch circuit 21 or 22 is a primary or secondary selector and diverter system 23 or 24 respectively. Each of the systems 23 and 24 is adapted to respond to a predetermined signal from a passing message carrier traveling along the conduit system and to be actuated in response to that signal to divert the carrier into the immediately succeeding branch conduit 21 or 22, as the case may be. When the carrier passes a selector and diverter system which is not responsive to the signal from the carrier, that system will not be actuated and the carrier will continue to travel uninterruptedly along the conduit that it happens to be in. The message carrier is provided with adjustable signal means for predetermining its signal, whereby the carrier is addressed to a particular station as described below.

Preferably associated with each conduit 21 is a return conduit 25 which leads into the trunk conduit 20 and is fed from a number of branch inlet conduits 26 associated in turn with the branch conduits 22. One or more message carriers are propelled along the tubular conduit system by pneumatic pressure maintained in the system by means which may be conventional and are accordingly not shown herein, the pressure decreasing in the direction of the arrows from the inlet conduits 26 to the discharge conduits 22 along the conduits 25, 20, and 21. As indicated in Fig. 1, the several branch conduits angle into or out of the system in accordance with the direction of pressure decrease so as to facilitate uninterrupted unidirectional travel of the carrier along the system in the direction of the arrows. Also as indicated in Fig. 1, all of the conduits 25 lead into the conduit 20 at a portion of the latter in advance of the conduits 21, i.e. on the high pressure side thereof. Thus by properly adjusting the signal adapted to be given by a carrier, the latter may be dispatched from any station through the conduits 26 to any other station via the conduits 25, 20, 21 and 22 in turn.

For example, if a message is to be sent to the station fed from the second conduit 22 branching from the third conduit 21, counting in the direction of travel indicated by the arrows, the signal means on the carrier will be adjusted to actuate only the third primary selector and diverter system 23 and only the second secondary selector and diverter system 24 upon passing the same. The carrier will then be fed into one of the conduits 26 from which it will travel via the associated conduit 25 into the primary conduit 20. In the latter conduit, the carrier will pass the first two selector and diverter systems 23, since these will not be responsive to the carrier's signal. At the third system 23, the latter will be actuated to divert the carrier into the third conduit 21, whereupon the carrier will pass the first system 24 in that conduit and will be diverted into the second branch conduit 22 of the conduit 21 by actuation of the second system 24 in the latter conduit.

Beyond the last or endmost selector and diverter systems 23 and 24, the conduits 20 and 21 respectively extend in the direction of the arrows 27 to a dead letter station. Likewise the pneumatic pressure decrease continues in the direction of the arrows 27 to the dead letter station, so that if the signal means of a carrier is inadvertently adjusted to give a signal for which none of the selector and diverter systems 23 or 24 is adapted to respond, the carrier will travel to the dead letter station and may thus be properly readdressed by suitably adjusting its signal means. A number of dead letter stations may be provided if desired, or the several conduits extending from the arrows 27 may feed to a single station.

Details of a preferred selector and diverter system adapted to be employed both at 23 and 24 and comprising a diverter mechanism and an electronic selector circuit are illustrated by way of example in Fig. 2. A portion of a tubular conduit A, which may comprise either the trunk conduit 20 or one of the branch conduits 21 of Fig. 1, is connected by a Y-coupling 28 to a tubular branch conduit B, which correspondingly may comprise one of the branch conduits 21 or 22 of Fig. 1. The diverter mechanism of the system comprises a gate member 29 pivotal at 30 to swing from an open position in parallelism with the conduit A, Fig. 2, to a diverting position in parallelism with the conduit B at the location of its juncture with the conduit A. The gate 29 is normally urged to the open position by means not shown and is operated by a lever 31 keyed to the gate at the pivot 30, so as to swing the gate leftward to the diverting position upon downward swinging of the lever 31. The latter is pivotally connected at 32 to the shiftable core 33 of a solenoid 34 and is swung downward about the pivot 30 in unison with downward movement of the core 33 when the solenoid 34 is energized. The diverter mechanism may be conventional if desired and is accordingly not described in further detail.

The electronic selector circuit of the system comprises a number of axially spaced signal detector or induction coils 35, 36, 37 and 38 arranged coaxially around the conduit A adjacent and in advance of the coupling 28 with respect to the direction of travel indicated by the arrows. Four such detector coils 35 through 38 are shown diagrammatically in the present instance without reference to proportions. Ordinarily the axial length of each coil will be but a fraction of an inch, whereas the conduit A may be several inches in diameter.

The coils 35, 36, 37 and 38 are suitably coupled through amplifying and shaping circuits 39, 40, 41 and 42 respectively with the screen and control grids 43, 44, 45 and 46 respectively of a pair of thermionic gaseous discharge tubes or thyratrons 47 and 48. The plate circuit of tube 47 extends in series through a relay coil 49, a normally closed relay shunt switch 50, low resistance shunt 51, limit switch 52, plate potential source 53, and cathode of tube 48. The plate of tube 48 is connected to the cathode of tube 47, so that the plate currents of the tubes 47 and 48 are in series. In consequence each tube 47 or 48 serves as an open switch for the other and neither tube can fire, i.e. conduct plate current, except in unison with firing of the other tube.

A negative bias on the screen and control grids 43 and 44 of tube 47 is indicated by the potential source 54 connecting the cathode of tube 47 with said grids 43 and 44 through the circuits 39 and 40 respectively. Similarly a negative bias on the screen and control grids 45 and 46 of tube 48 is indicated by the potential source 55 connecting the cathode of tube 48 with said grids 45 and 46 through circuits 41 and 42 respectively. The negative bias on the grids 43 through 46 is determined so as to prevent firing of the associated tubes 47 and 48 until predetermined positive potential impulses are applied to the grids simultaneously, as for example from the circuits 39 through 42 respectively.

By the circuit described, potential impulses induced in the coils 35 through 38, as for example by permanent magnetic signal means on a message carrier traveling along the tube A, are fed to the circuits 39 through 42 respectively. The latter are designed to amplify and shape predetermined impulses from the associated detector coils 35 through 38 and to apply the amplified impulses to the associated grids 43 through 46 to raise the potentials of the latter to the necessary levels at which the tubes 47 and 48 will fire. Inasmuch as numerous circuits for this purpose are well known to the art, the circuits 39 through 42 are not shown in detail.

It is apparent that when the predetermined impulses are momentarily induced simultaneously in the coils 35 through 38, the tubes 47 and 48 will fire, energizing relay coil 49, closing the normally open relay switch 56 and opening shunt switch 50. As a result, a circuit through switch 56, potential source 47, and solenoid 34 is closed, energizing the latter to cause shifting of gate 29 to the diverting position as described above, whereupon a message carrier traveling along conduit A in the direction of the arrows will be diverted into the branch conduit B. Immediately after being diverted into conduit B, the carrier will strike a limit switch operator 58 in the sidewall of tube B, thereby opening limit switch 52 to interrupt the plate circuit through tubes 47 and 48 and permit the latter to cease firing. Relay 49 will then be deenergized, permitting switches 56 and 50 to return to their normal conditions, as indicated in Fig. 2. Opening of switch 56 will also de-energize solenoid 34, permitting gate 29 to return to its normally open or non-diverting position, Fig. 2.

In the event that the signal means of a carrier passing the coils 35 through 38 are not adapted to induce the aforesaid predetermined impulses in all of the coils 35 through 38 simultaneously, it is apparent that the tubes 47 and 48 cannot fire, the diverter mechanism will not be actuated, and the carrier will continue along conduit A and through the coupling 28 without diversion. However, once the tubes 47 and 48 have been caused to fire, as for example by passage of a carrier having the necessary signal required to induce the aforesaid predetermined potential impulses in the coils 35 through 38 simultaneously, firing of the tubes 47 and 48 will continue until their plate circuit is interrupted, as for example by the opening of limit switch 52. Accordingly a resistance 59 is provided in parallel with shunt 51 to protect relay 49 from the full sustained plate potential across tubes 47 and 48. At the instant firing of tubes 47 and 48 commences, a sudden large potential is applied across solenoid 49 by virtue of shunt 51 which bypasses resistance 59 through normally closed switch 50. Relay 49 will thus respond rapidly to close normally open switch 56 and to open normally closed switch 50. Upon opening of the latter switch, the circuit through relay 49 is completed through protective resistance 59. During the short interval required for opening of switch 50, relay 49 is protected by its own high inductance.

It is to be noted that the portions of the selector and shaping circuits exclusive of the detector coils 35 through 38 are fundamental and may be employed with other types of pulse forming circuits replacing inductive type detector coils. Thus for example a number of detectors responsive to the energy emission from radioactive material may be spaced axially along the conduit A in substitution for the detector coils 35 through 38 and adapted to receive radially directed signals from a corresponding number of radioactive cells adjustably spaced axially on the message carrier. In Figs. 3 and 4, the detector coils 35 through 38 are replaced by pulse forming circuits 60, 61, 62, and 63 which are coupled respectively to amplification and shaping circuits comparable to the circuits 39 through 42. In all other respects, the selector circuits are unchanged from those shown in Fig. 2 and are accordingly not repeated in the drawings.

The circuits 60 through 63 are all the same, each having for its principal element a photomultiplier tube in an operative circuit (not shown). One of such tubes 60a, which are well known to the art, is indicated schematically in Fig. 4 and comprises a coated cathode arranged to receive radiant energy from an external source and to emit a feeble electronic current to the first of a series of dynodes, whereupon the current is successively directed from dynode to dynode in the series and multiplied by secondary emission at successive dynodes. From the last dynode in the series, the highly amplified electronic current is directed through the anode of the tube to the amplification and shaping circuit as described above in connection with Fig. 2. Since the photomultiplier tubes are amplifiers, it is apparent that these tubes may also be considered part of the amplification circuits. The necessity of subsequent amplification would depend upon the amplification factor of the tube and the initial radiant energy of the pulse originating signal.

In order to direct a signal from a radioactive cell on the carrier to the cathode of the photomultiplier tube in each circuit 60 through 63, transparent annular rings 64, 65, 66 and 67 are provided around the tube A adjacent the photomultiplier tubes. The rings 64 through 67 are alike and comprise material having a high index of refraction, such as optical glass or one of the methyl methacrylate plastics for example known to the trade as Lucite or Plexiglas. Each ring 64 through 67 is also coated with a phosphor or suitable chemical, such as the coating 64a around the inner circumference of the tube 64, adapted to glow or luminesce when energized by radio-active emission.

A notch, such as the notch 68 formed in ring 64 and confronting tube 60a so as to direct light energy from within ring 64 to the cathode of tube 60a by the well known "edge lighting" effect, is similarly formed in each ring 64 through 67. Accordingly when a radioactive cell on a message carrier passes through ring 64, radiant energy directed outward from the cell through the tube A will cause the coating 64a to luminesce. Light from the glowing coating 64a will enter the ring 64 and by virtue of the high index of refraction of the latter be conducted circumferentially by diffusion and refraction to the notch 68 and then to the cathode of tube 60, regardless of the portion of the ring 64 into which the emission from the radioactive cell is directed. In the above regard of course, the material of the conduit A at the region of the ring 64 is of steel or aluminum or other suitable material which is not opaque to the radioactive emission.

Since the rings 65, 66, and 67 are coated and notched similarly to the ring 64 and arranged to direct light energy to the cathodes of the photomultiplier tubes of the associated circuits 61 through 63, a passing carrier provided with a suitable set of radially outward emitting radioactive cells spaced axially to match the axial spacing of the rings 64 through 67 will energize the photomultiplier tubes in the circuits 60 through 63 simultaneously. Signal pulses will thus be transmitted to all of the amplifying and shaping circuits simultaneously, the four grids of the tubes 47 and 48 will be raised to their firing potentials simultaneously, and the gate 29 will be shifted to the diverting position as above described. For any other axial spacing of the radioactive cells on the carrier which does not cause simultaneous stimulation or energizing of all four circuits 60 through 63, the gate 29 will remain in the open position of Fig. 2 and the carrier will not be diverted.

Another pulse forming means responsive to radio active emission is shown in Figs. 5 and 6 wherein, in place of the coils 35 through 38 or rings 64 through 67, annular Geiger tubes 69, 70, 71, and 72 are arranged coaxially around the conduit A in accordance with a predetermined axial spacing pattern and connected with suitable pulse forming circuits 73, 74, 75 and 76 respectively. Since the circuits 73 through 76 are alike in construction and operation and are similarly connected with their respective tubes 69 through 72, the circuit 73 for tube 69 only is shown in Fig. 6. Each Geiger tube comprises an outer electrical conducting tubular shell or anode and an inner cathode, such as the annular cathode 77 of the tube 69. The interior of each tube 69 through 72 contains a suitable gas such as hydrogen under low pressure and adapted to break down or ionize when subjected to the emission from a radioactive source. The cathode and anode of tube 69 are connected through a potential source 78 and resistance 79 in the pulse forming circuit 73, whereby a potential drop across resistance 79 and consequent signal pulse in circuit 73 are effected upon ionization of the gas within the tube 69.

The other tubes 70 through 72 are similarly connected to their respective circuits 74 through 76. The circuits 73 through 76 are connected to the grids 43 through 46 respectively through amplification and shaping circuits comparable to the circuits 39 through 42 so as to raise the potentials of the grids 43 through 46 to the predetermined firing potentials in response to predetermined signal pulses from the circuits 73 through 76. Each tube 69 through 72 is constructed of suitable material adapted to transmit the emission from radioactive cells spaced axially on the carrier. Upon passage of a carrier having such cells spaced to match the axial spacing of the tubes 69 through 72, the predetermined signal pulse will be developed in each of the circuits 73 through 76 simultaneously, the tubes 47 and 48 will fire, and the gate 29 will be actuated to divert the carrier into the branch B.

Another pulse forming means responsive to a magnetic field traveling with the message carrier is shown in Fig. 7 wherein, in place of the coils 35 through 38, coils 80, 81, 82 and 83 are arranged coaxially around the conduit A in accordance with the desired axial spacing. The material of the coils 80 through 83 is characterized by the fact that its electrical resistance is a function of the strength of the magnetic field thereat. An example of such a material is bismuth wire which decreases in electrical resistivity as the magnetic field acting thereon decreases. The terminals of the coils 80, 81, 82 and 83 are connected respectively to suitable pulse forming circuits 84, 85, 86 and 87, each of which may comprise a bridge circuit or a potential divider circuit for example adapted to respond to a change in resistance in the associated coils 80 through 83 to generate an electrical pulse.

Thus for example a predetermined potential is maintained across each of the coils 80 through 83. When a message carrier having axially spaced permanent magnets for signal means passes through the loops 80 through 83, their electrical resistances will be altered and a signal pulse will be developed in the circuits 84 through 87. The latter are connected to the grids 43 through 46 respectively through the amplification and shaping circuits respectively comparable to the circuits 39 through 42, so as to raise the potential of the grids 43 through 46 to their firing potentials in response to a predetermined signal pulse in the coils 80 through 83.

It is apparent that when a carrier traveling through conduit A has a set of suitable permanent magnets spaced axially so as to match the axial spacing of the coils 80 through 83, the circuits 84 through 87 will be stimulated simultaneously upon passage of the carrier to transmit signal pulses to the associated amplifying and shaping circuits. The four grids 43 through 46 of the tubes 47 and 48 will then be raised to their firing potentials simultaneously and the gate 29 will be shifted to the diverting position as above described. Any other axial spacing of the permanent magnets on the carrier which does not cause simultaneous stimulation of all four circuits 84 through 87, will not actuate the gate 29 and the carrier will not be diverted.

Unlike the signal detection system illustrated in Fig. 2 which is dependent upon the speed of the carrier for efficient operation of the gate 29, the systems illustrated in Figs. 3 through 7 operate independently of the speed of the carrier and are thus highly efficient for use with either high or low speed carriers. The efficiency of detecting the magnetic or radioactive emissive type signal from the carrier is also increased by forming the conduit A of suitable material such as aluminum or plastic which will not interfere with the field of the magnetic signal means and which is not opaque to the radioactive emission, although steel conduits are feasible with the latter type of signal.

Referring to Figs. 8 through 10, a message carrier 88 is shown comprising a closed hollow cylindrical body adapted to be readily opened for insertion of a message therein and also adapted to travel along the tubular conduit system. In general, the body of the carrier 88 may be conventional, the present invention being concerned with the signal means on the carrier. Where the carrier is to be used with magnetic type signal means, as in Figs. 8 through 10, it will preferably be formed of suitable material which will not interfere with the magnetic fields. At each of a pair of diametrically opposed sides of the carrier body are a number of axially spaced openings 89, each adapted to receive one of a number of small removable radially polarized permanent magnets 90. A base plate 91 partitions each opening 89 from the hollow interior of the carrier and is formed with a socket 92 into which either end of one of the magnets 90 is insertable and positively located. At axially opposed sides of each opening 89, resilient prongs 93 of the body of the carrier 88 extend radially inward and terminate in confronting rounded locaters 94 adapted to be located yieldably in mating rounded sockets 95 in the magnets 90, Fig. 10, whereby the magnets are removably retained within the openings 89. The latter are oversize circumferentially with respect to the magnets 90 to facilitate insertion or removal thereof by means of a small tool. The magnets 90 are formed symmetrically at opposite ends so as to be reversably insertable into the openings 89 and are dimensioned to fit substantially flush with the outer cylindrical surface of the carrier 88.

The carrier 88 illustrated in Figs. 8 through 10 is adapted for use with the signal detector systems of Figs. 2 and 7 and is particularly adapted for use with the type of conduit system illustrated in Fig. 1. The magnets 90 are readily adjustable axially of the carrier 88 in numerous spatial combinations so as to match predetermined axial spacings of the detector coils 35 through 38 or 80 through 83. Where desired, three signal variations are possible with each opening 89, since a magnet 90 can be selectively inserted into the opening with either the north or south magnetic pole outward, or no magnet need be inserted into the opening. In the above regard the signal selector combination of the systems 23 and 24 will be predetermined so that each of the detector coils 35 and 38 and associated circuits 39 through 42 will be adapted to respond to the passing of only a north or only a south magnetic pole facing outward on the carrier.

In a preferred application of the carrier shown in Figs. 8 through 10 with the conduit system of Fig. 1, all of the selector and diverter systems 23 are adapted to be responsive to only one type of magnetic pole facing outward on the carrier, such as the north pole for example, whereas the systems 24 are adapted to be responsive only to the other or south magnetic pole facing outward. The carrier 88 is addressed to the proper station by inserting magnets 90 in the set of openings 89 at one side of the carrier with their north poles outward and spaced axially in conformance with the spacing of the detector coils 35 through 38 immediately preceding the branch conduit 21 into which the carrier is to be diverted. Similarly magnets 90 are inserted into the opposite set of openings 89 with their south poles outward and spaced axially in conformance with the spacing of the detector coils 35 through 38 immediately preceding the branch conduit 22 into which the carrier is to be diverted. As will be apparent below, a third set of axially extending openings for a radioactive type signal means will be employed where an extension of the system described is desired for complex installation.

By this system, the signal combination employed to actuate the selector and diverter systems 24 of any one branch conduit 21 may also be employed to actuate the systems 24 of the other branch conduits 21. If the total number N of branch conduits 22 are proportioned equally among n branch conduits 21, only N/n signal combinations will be required for the N different conduits 22. By minimizing the total number of different combinations required, the total number of openings 89 is reduced and the spacing between adjacent openings 89 is correspondingly increased.

An example of a radioactive signal means is illustrated in Figs. 11 through 13 wherein the outer wall of the carrier 88 is provided with an axial slot 96 opening into a number of axially spaced pairs of openings 97, the openings 97 of each pair extending circumferentially in opposite directions from the slot 96. The slot 96 and openings 97 are partitioned from the hollow interior of the carrier 88 by a base plate 98 similar to the partition 91. Slidable along the slot 96 are a number of vials or small containers 99 of lead or brass or other material adapted to contain a suitable radioactive material 100 and to prevent or minimize energy emission from each vial 99 except at the latter's orifice 101 opening outward through the slot 96. As indicated in Figs. 12 and 13, the interior sidewalls of the vial 99 converge outward toward the orifice 101 so as to direct the emission from the material 100 radially outward in a small diameter beam. The radially outer surface of the vial 99 is provided with ears or lugs 102 adapted to seat within the slots 97 and extends flush with the outer cylindrical surface of the carrier 88 when the lugs 102 are seated or located within the slots 97, Figs. 12 and 13. Outer shoulder portions of the body of each vial 99 closely underlie the inner cylindrical surface of the carrier 88 adjacent the slots 97 when the lugs 102 are seated therein and are pressed outward by a spring 103 interposed between the base of the vial 99 and base plate 98. The spring 103 is formed of a strip of resilient sheet material having an outer end secured to the base of the associated vial 99 and an inner end flush with the base plate and slidable axially therealong, Fig. 13. Paired parallel guide plates 104 extend axially the length of the slot 96 adjacent the circumferentially spaced ends of the vials 99.

The signal means illustrated in Figs. 11 through 13 is particularly adapted for use with the signal detection systems of Figs. 3 and 4 or Figs. 5 and 6. The axial spacing intervals between the corresponding signal detectors 64 through 67 or 69 through 72 are multiples of the axial distance between adjacent pairs of the slots 97. By spacing a number of vials 99 axially on the carrier 88 so as to match the spacing of the signal detectors 64 through 67 or 69 through 72 at the station to which the carrier 88 is to be sent, all of the signal detectors associated with that station will be activated simultaneously by the radioactive emission from the several vials upon passage of the carrier 88. In consequence the carrier will be diverted into the immediately succeeding branch circuit as described above.

In order to index or adjust the vials 99 axially, the lugs 102 of the vial 99 to be adjusted are disengaged from the slots 97 by depressing the vial inward against the spring 103, whereupon the vial is slidable axially of the carrier 88 to a desired adjusted position underlying another pair of slots 97. Upon release of the indexed or adjusted vial 99, the spring 103 will seat the lugs 102 within the overlying slots 97, whereby the vial 99 is positively located at the indexed or adjusted position.

As indicated in Figs. 14 through 18, instead of shifting the signal means axially to achieve the various desired signal combinations, a number of the signal means are arranged on the carrier in an axially extending row and selectively shielded from the signal detectors or otherwise rendered ineffective in various desired signal combinations. In Figs. 14 through 16, a number of vials 105 generally similar to the vials 99 are arranged in a row between the side plates 104 and base plate 98. Each vial 105 contains radioactive material 100 and has a conical hollow interior converging to an orifice 101. In the present instance each vial 105 is pivotally supported between a pair of pins 106 spacing adjacent vials 105 and supported in turn by brackets 107 extending between the side plates 104. Keyed to each vial 105 coaxially with the pins 106 is a knurled disc 108 by which the vials are rotated, Fig. 15. Thus any vial can be rotated to direct its emission inward of the carrier and rendered ineffective as a signal means. By turning the orifices 101 of certain vials 105 inward and others outward so as to align with an axially extending slot 109 in the outer cylindrical wall of the carrier 88, various signal combinations are achieved to match predetermined spatial combinations of the radioactive signal detectors, such as the detectors 64 through 67 or 69 through 72 for example.

In Figs. 17 and 18, a number of vials 110 similar to the vials 99 and 105 and containing radioactive material 100 are arranged on the carrier 88 in an axially extending row similar to the vials 105. In this instance, the vials 110 are secured immovably between the side and base plates 104 and 98 respectively. The orifice 101 of each vial 110 is selectively covered by a shield 111 which is opaque to the radioactive emission and which is pivoted to the outer end of the vial 110 by a pin 112, Fig. 18, so as to swing to and from a cover position, Fig. 17. Each cover 111 lies within an opening 113 in the outer cylindrical wall of the carrier 88 and is thus substantially flush with the latter, the opening 113 being also adapted to align with the vial orifice 101 when the latter is not closed by the swinging cover 111. The pivotal vial 105 or cover 111 may be frictionally retained in their adjusted positions or may be detained by suitable detent means, similar to the spring detent illustrated in Fig. 10 by way of example.

It is to be noted that the removable magnetic signal means 90 shown in Fig. 10 can be replaced by a similarly mounted vial containing radioactive material, as illustrated in Figs. 11 through 18, or the vials in Figs. 11 through 18 can in each case be replaced by the magnetic type signal means 90. In reference to Fig. 15, the use of pivotally mounted magnets 90 to replace the vials 105 permits reversing the polarity of the magnetic signal. In reference to Fig. 18, each magnetic type signal means 90 is readily shielded from the signal detector by suitably connecting opposite magnetic poles through the medium of a shiftable magnetic conductor such as a ferro-magnetic material. Thus as described, the carrier 88 can be selectively provided with different signal combinations comprising either or both the magnetic or radioactive type signal means removably of shiftably or shieldably mounted thereon.

Another magnetic type signal system is illustrated in Fig. 19 wherein a number of radially polarized magnets 114 similar to the magnets 90 are spaced axially on the carrier 88. In this case the magnets 114 are positively secured in a row to the base plate 91, an outer end of each magnet 114 extending outward through an opening in the carrier sidewall and terminating substantially flush with the latter. Instead of removing or shifting the magnets 114, a polarizing machine is provided for selectively polarizing or depolarizing the magnets 114 in accordance with a desired predetermined signal combination. The polarizing machine comprises a number of polarizing solenoids 115, each adapted to be reversibly connected in a direct current circuit by selectively closing switches 116 or 117 or to be connected in an alternating depolarizing circuit by closing switch 118. The coils 115 are spaced to match the axial spacing of the magnets 114 and are arranged so that the carrier can be located with the outer end of each magnet 114 adjacent one end of one of each of the coils 115.

By selectively closing the circuit through the proper one of the switches 116, 117 or 118 for each coil 115, while leaving the other switches for that coil open, each magnet 114 is polarized or depolarized as desired. A previously polarized magnet 114 can thus be depolarized or reversed in polarity if desired. Although three independent switches 116, 117 and 118 are illustrated with each coil 115 for the sake of simplifying the circuit diagram, a single multiple-pole three-position switch will be employed where desired to eliminate the possibility of closing more than one of the switches 116, 117, and 118 for any one coil 115 at one time. In application of the structure shown in Fig. 19, a polarizing machine of the character shown is supplied at each message sending station. A carrier 88 to be dispatched is inserted into the polarizing machine with one of the magnets 114 adjacent each polarizing coil 115 and addressed to the desired magnetic responsive selector system by selectively closing the proper switch 116 or 117 or 118 associated with each coil 115, thereby to polarize the magnets 114 in accordance with a predetermined signal combination to which the desired selector system is responsive.

We claim:

1. In a message conveyer system, a carrier adapted to travel along a conduit system, signal means on said carrier adapted to emit a predetermined magnetic field signal comprising a plurality of slugs adapted to be magnetically polarized radially of said carrier and arranged thereon at fixed locations spaced axially of the carrier, and means separate from said carrier for selectively polarizing said slugs.

2. In a message conveyer system, a carrier adapted to travel along a conduit system, signal means on said carrier adapted to emit a predetermined magnetic field signal comprising a plurality of slugs adapted to be magnetically polarized radially of said carrier and arranged thereon at fixed locations spaced axially of the carrier, and means separate from said carrier for selectively polarizing said slugs, said last named means being provided with means for selectively producing a north magnetic field adjacent the radially outer end of each slug, means for selectively producing a south magnetic field adjacent the radially outer end of each slug, and means for selectively producing an alternating magnetic field adjacent the radially outer end of each slug.

3. The combination in a message carrier according to claim 1 wherein said means for selectively polarizing said slugs comprises a polarizing machine having a plurality of magnetic field producing elements adapted to register with said slugs respectively.

4. The combination in a message carrier according to claim 1 wherein said means for selectively polarizing said slugs comprises a polarizing machine having a plurality of polarizing solenoids extending radially of said carrier and adapted to register with said slugs respectively adjacent their radially outer ends, and means for selectively connecting each solenoid with an alternating electric current or reversibly with a direct electric current.

5. A message carrier adapted to travel along a conduit system, and signal means on said carrier comprising a plurality of permanent magnets polarized radially of the carrier and adjustably mounted thereon for adjustment both axially of the carrier and reversibly as to polarity to effect a predetermined magnetic field pattern.

6. A message carrier adapted to travel along a conduit system, and signal means on said carrier comprising a plurality of magnetic slugs polarized radially of the carrier and adjustably mounted thereon for adjustment both axially of the carrier and reversibly as to polarity to effect a predetermined magnetic field pattern.

7. A message carrier adapted to travel along a conduit system, and signal means on said carrier comprising a plurality of magnetic slugs polarized radially of the carrier and adapted to be removably mounted on said carrier at locations spaced axially thereof and to be reversed end to end at said locations.

8. A message carrier adapted to travel along a conduit system, and signal means on said carrier comprising two sets of magnetic slugs polarized radially of the carrier, the slugs of each set being adjustably mounted on said carrier for adjustment axially thereof at locations spaced circumferentially from the slugs of the other set.

9. A message carrier adapted to travel along a conduit system, signal means comprising two sets of magnetic slugs polarized radially of the carrier, retaining means on said carrier for releasably retaining the slugs of one set at a plurality of locations spaced axially of said carrier, and other retaining means on said carrier spaced circumferentially from the first named retaining means for releasably retaining the slugs of the other set at a plurality of locations spaced axially of said carrier.

10. The combination according to claim 9 wherein said slugs are reversible end to end at said locations.

References Cited in the file of this patent

UNITED STATES PATENTS

| | | |
|---|---|---|
| 1,797,651 | Gergacsevics et al. | Mar. 24, 1931 |
| 1,797,864 | Harlandt | Mar. 24, 1931 |
| 1,946,307 | Chambers | Feb. 6, 1934 |
| 1,983,342 | Chambers | Dec. 4, 1934 |
| 2,006,305 | Wilder | June 25, 1935 |
| 2,039,016 | McGuinness et al. | Apr. 28, 1936 |
| 2,043,293 | Jennings | June 6, 1936 |
| 2,052,597 | Beckmann | Sept. 1, 1936 |
| 2,085,265 | Mauch et al. | June 29, 1937 |
| 2,128,671 | Drenkard | Aug. 30, 1938 |
| 2,150,440 | Hargreaves | Mar. 14, 1939 |
| 2,198,541 | Krebs | Apr. 23, 1940 |
| 2,241,917 | Mehlis et al. | May 13, 1941 |
| 2,456,233 | Wolf | Dec. 14, 1948 |
| 2,550,107 | Coltman | Apr. 24, 1951 |
| 2,601,391 | Halpern | June 24, 1952 |
| 2,620,435 | Vogt et al. | Dec. 2, 1952 |

FOREIGN PATENTS

| | | |
|---|---|---|
| 489,701 | Germany | Jan. 18, 1920 |
| 603,042 | Germany | Sept. 21, 1934 |